April 19, 1938. A. A. FRIESTEDT 2,114,444
STEERING CONTROLLER
Filed Aug. 28, 1935 5 Sheets-Sheet 1
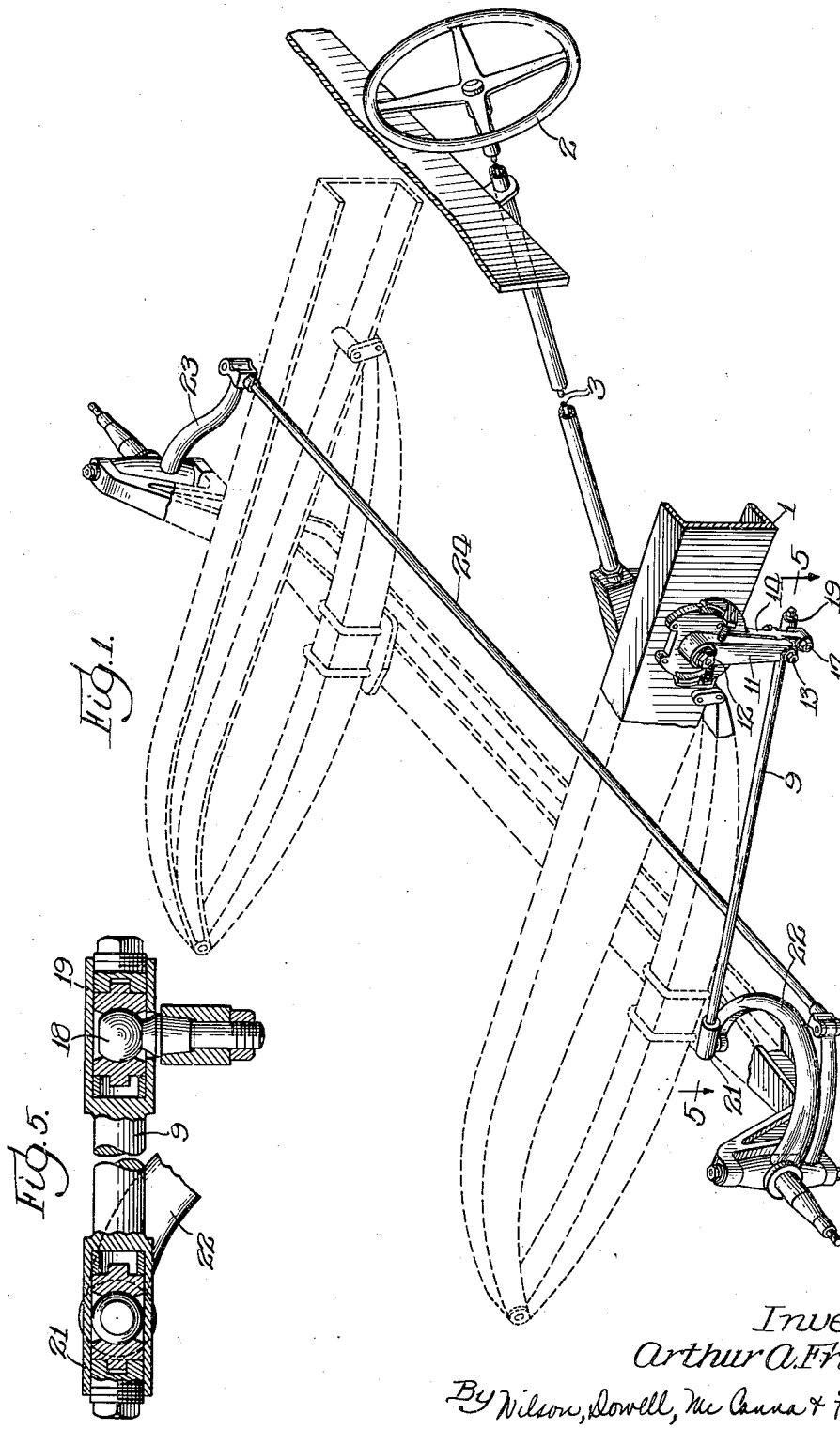
Inventor:-
Arthur A. Friestedt,
By Wilson, Dowell, McCanna & Foley Attys.

April 19, 1938.  A. A. FRIESTEDT  2,114,444
STEERING CONTROLLER
Filed Aug. 28, 1935  5 Sheets-Sheet 2
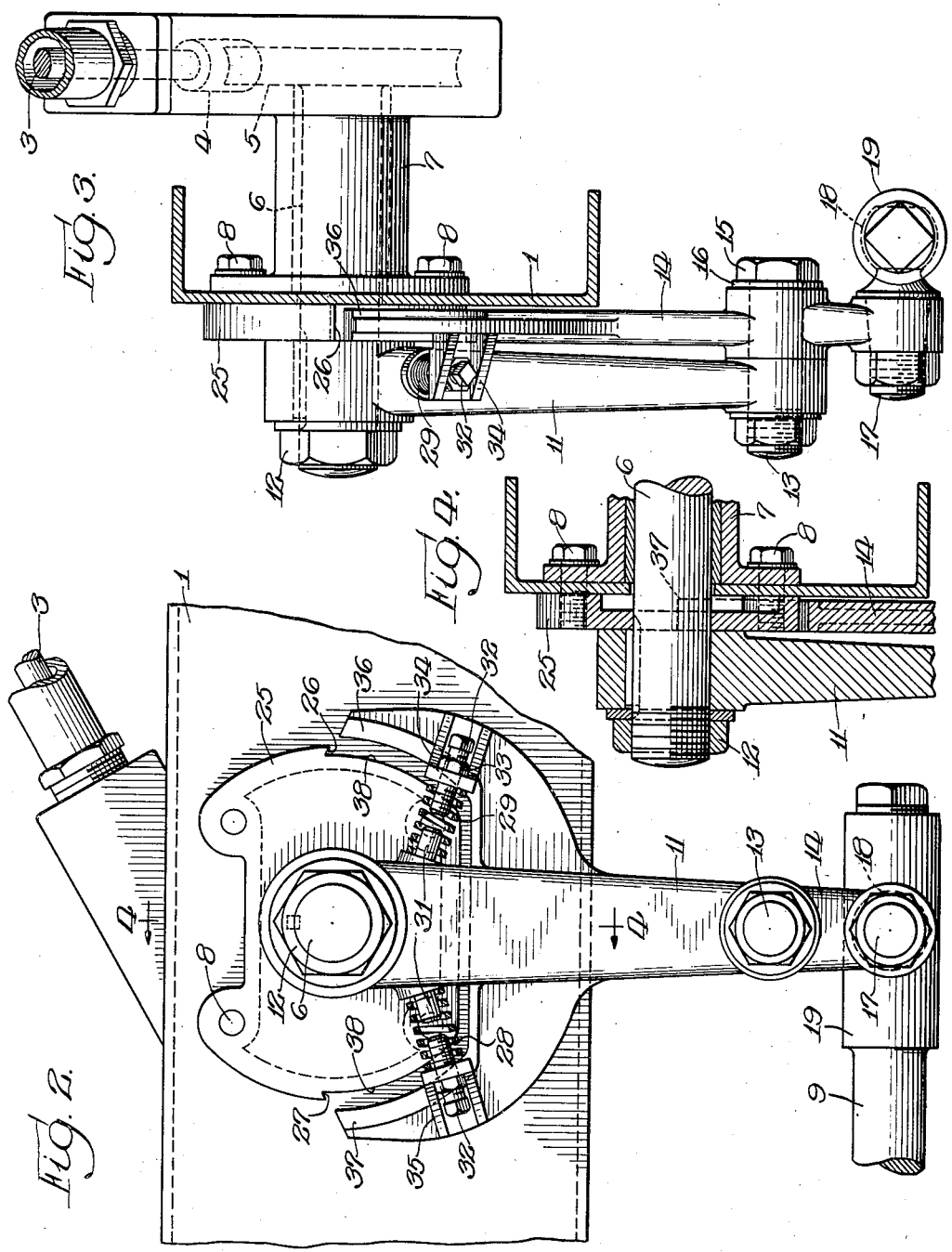

April 19, 1938.  A. A. FRIESTEDT  2,114,444
STEERING CONTROLLER
Filed Aug. 28, 1935   5 Sheets-Sheet 3

Inventor:-
Arthur A. Friestedt,
By Wilson, Dowell, McCanna & Foley Attys.

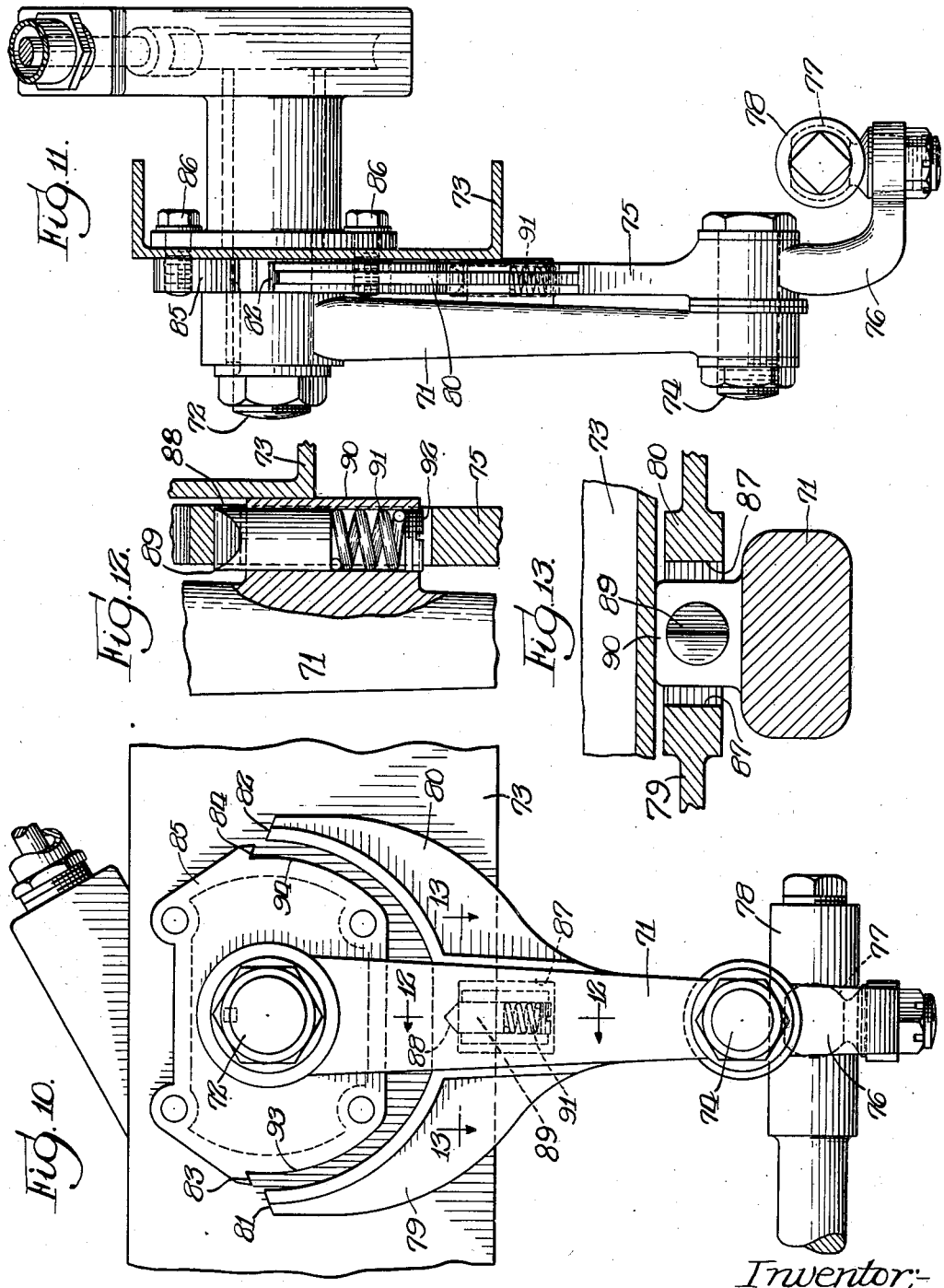

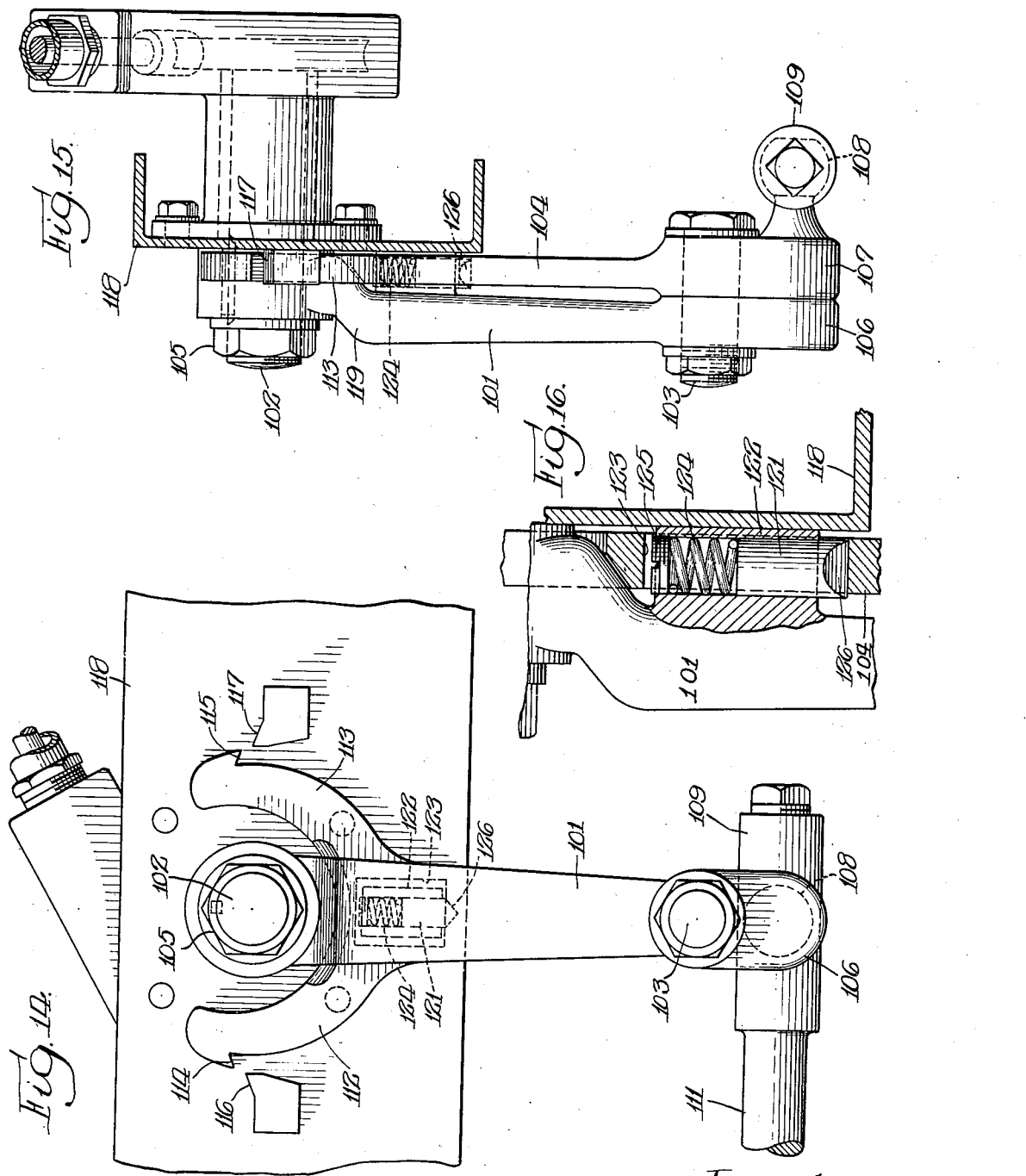

Patented Apr. 19, 1938

2,114,444

UNITED STATES PATENT OFFICE 2,114,444

STEERING CONTROLLER

Arthur A. Friestedt, McHenry, Ill.

Application August 28, 1935, Serial No. 38,194

9 Claims. (Cl. 280—89)

This invention pertains to improvements in steering apparatus for vehicles having dirigibly mounted running wheels.

The invention described herein constitutes an improvement over the inventions disclosed in my copending applications Serial No. 671,153, filed May 15, 1933, Serial No. 671,154, filed May 15, 1933, and Serial No. 709,088, filed January 31, 1934, now Patents Nos. 2,060,804, 2,064,600 and 2,063,920, respectively.

Among the general objects of this invention is to provide improvements in vehicle steering apparatus embodied in constructions which are simple and sturdy and give an assurance to drivers against loss of control when the running wheels are subjected to severe shocks and thrusts.

The particular objects of the invention will be alluded to in connection with the description of the various embodiments of the invention.

Referring now to the drawings:

Fig. 1 is a perspective view showing this invention embodied in the steering apparatus of a vehicle;

Fig. 2 is a side elevation of the control apparatus shown in Fig. 1;

Fig. 3 is an elevation of the control device viewed from the rear;

Fig. 4 is a fragmentary sectional view on the line 4—4 of Fig. 2;

Fig. 5 is a detail view of drag link sockets with the usual springs eliminated therefrom;

Fig. 10 is a side elevation of a modified form of the invention;

Fig. 11 is a rear elevation of the modification shown in Fig. 10;

Fig. 12 is a section of a portion of the device on the line 12—12 of Fig. 10;

Fig. 13 is a sectional view taken on the line 13—13 of Fig. 10;

Fig. 14 is a side elevation of another modification of the invention;

Fig. 15 is a rear elevation of the modification shown in Fig. 14; and

Fig. 16 is a fragmentary view with parts in section showing in more detail the centering latch of the device shown in Fig. 14.

Figure 8:
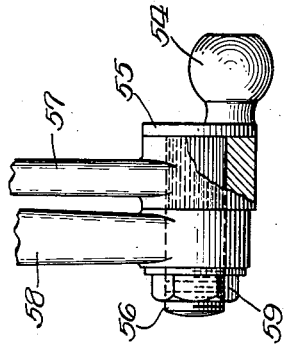
Fig. 8 is another fragmentary view showing a third manner of mounting the ball member on a control arm.

Referring now to the first embodiment of the invention shown in Figs. 1 to 5 inclusive, the channel member of the vehicle frame is designated as 1, this being the left channel iron on which it is at present customary to secure the steering gear for left-hand drive vehicles. While the invention might be used with some other form of initial control of a steering apparatus, it is contemplated that it will find immediate and extensive use in connection with manually controlled steering apparatus including a steering wheel such as the wheel 2 fixed upon a shaft 3, the latter carrying at its lower end a worm gear 4 meshed with a worm sector gear 5. As is customary at the present, the sector gear 5 is fixed on a shaft 6, the shaft being supported in a housing or bearing member 7 which is bolted or otherwise secured to the frame 1, as for example, by means of the cap screws 8.

While the worm gear and worm sector are herein illustrated, it should be understood that any other appropriate means for transmitting the motion of the steering wheel to the steering shaft 6 may be employed in connection with this invention. A number of such other devices are in use to some extent at present on vehicles in this country but it will be obvious from a perusal of this specification that any of them may be appropriately used with the essential parts of this invention.

Heretofore it has been customary to fix on the end of the shaft 6, which protrudes to the outer side of the frame, a drop arm or steering arm having a ball at its lower end connected with the rear end of a pitman rod or drag link, for example, such as the drag link 9. However, in this invention there is fixed on the outer end of this shaft, as by splining or some other suitable manner, a steering arm 11 which is indirectly connected with the drag link. A nut 12 holds the arm 11 secured against lateral movement outwardly on the shaft. At the lower end of the arm 11 is suported a pin 13 which forms the pivot for a control lever 14, the arm and lever being held pivotally connected but free from play by threading the pin 13 into the arm until the nut 15 and washer 16 force the adjacent faces of the arm and lever snugly together, the lever being allowed to rotate freely upon the pin.

At the lower end of the lever 14 is carried a pin 17 having a ball 18 integral therewith seated in the rear socket 19 on the drag link 9. The drag link in turn is connected at its forward end by means of a ball and socket joint 21 to the left front steering knuckle arm 22. The steering motion may be transmitted to the right front steering knuckle arm 23 by means of a tie rod 24. It may be noted here that it is unnecessary to allow for any cushioning springs in connection with the tie rod 24, due to the fact that ample cushioning of ordinary road shocks is provided elsewhere in the device, as will be explained hereinafter.

Furthermore, it may be stated here that this invention may also be used with center controlled steering apparatus wherein a drag link is used which transmits the steering motion from the wheel and which is responsive to both ordinary and extraordinary road shocks.

The steering shaft 6, or what is frequently called the sector shaft, extends not only through the housing 7 and the channel frame member 1, but also through a stationary plate 25 which is fixed upon the frame by means of the cap screws 8. This plate may have more than two teeth but, in its preferred form, is provided only with the teeth 26 and 27. In the normal operation of the device, the lever 14 and arm 11 are held in a parallel relationship by means of the cushioning springs 28 and 29 whose inner ends are engaged by pilots 31 formed on the side of the arm 11 and whose outer ends surround adjustable pilots 32, these latter pilots being locked in any desired position by means of nuts 33. The opposing ends of the pilots also serve as a means for positively limiting the amount of deflection which the lever may take relatively to the steering arm. The adjustable pilots are carried by ears 34 and 35 which are formed on the bifurcated upper end of the control lever 14.

The bifurcations of the lever 14 constitute dogs 36 and 37 which are shaped for and intended to engage the adjacent teeth 26 or 27 whenever the lever 14 is sufficiently deflected from its normal position parallel to the steering arm at such times as the steering arm is vertical, or nearly so.

In the normal operation of the entire steering apparatus, the torque is transmitted from the manual steering wheel through the shaft 6, arm 11, the lever 14 to the drag link without disturbing the approximately parallel relationship of the arm and lever, that is, when the front wheels are not offering much resistance to being deflected. Should they turn hard, as when the car is standing still, the cushioning spring 28 or 29 will be somewhat compressed, but these springs will have sufficient strength so that neither dog 36 nor 37 will strike the check plate 25. Due to the stiffness of the cushioning springs, ordinary steering motions will be transmitted just as though the lever and arm were a single unitary piece.

As is usual in steering apparatus of this character, when the arm 11 is approximately vertical, the running wheels are pointed straight ahead. The swinging of the lower end of the arm 11 forwardly from its center position causes the car to steer to the left while opposite movement of the steering arm will steer the car to the right.

In the normal travel of the car, the front wheels are constantly being subjected to minor shocks due to road surface irregularities and these shocks are transmitted back through the drag link toward the steering wheel. If the cushioning springs were omitted, even though the front and rear drag link sockets were equipped with springs, as has been customary, a great many of these ordinary road shocks would be felt disagreeably in the steering wheel. When my invention is employed, however, these ordinary road shocks are completely absorbed by the cushioning springs, even when the drag link sockets are omitted, and are hence not felt at all at the steering wheel and have no tendency to turn that wheel.

When extreme or extraordinary shocks occur, such as result from the blowing out of a front tire or a front wheel striking an obstruction or a hole in the pavement or running into sand or encountering ruts, rails or road shoulders, these unusual shocks have heretofore had a strong tendency to cause the manual steering wheel to be wrenched out of the hands of the driver and spun around as the wheels are deflected, oftentimes resulting in serious and even fatal accidents. But should such a severe or extraordinary shock occur when the vehicle is equipped with this invention, the resultant strong thrust forwardly or rearwardly on the drag link will cause the lever 14 to swing relatively to the arm 11 until the opposing spring pilots strike, which is calculated to enable the associated dog 36 or 37 to engage the tooth 26 or 27, if the car happens to be travelling straight ahead or nearly so at the time the shock occurs. If the thrust on the drag link happens to be tending to push the steering arm to the rear, the dog 36 will be rotated over into contact with the check plate, and if the apparatus is in the position shown in Fig. 2 at the time the shock occurs, the dog 36 will swing in to a position in front of the tooth 26 before the further rearward thrust on the drag link backs it up against the tooth 26. When the dog and tooth become engaged, no further movement in that direction of the drag link may occur. Thus the thrust will be transmitted to the frame of the car rather than through the steering gear mechanism up to the wheel. No matter how severe the shock may be, the driver under the circumstances will not lose control of the car. If the thrust thereafter diminishes so that it is insufficient to hold the spring 29 compressed, the arm and lever will be restored to parallel position and the usual dirigibility of the car will be regained.

If, while the cushioning spring 29 is fully compressed, the driver desires to steer the car toward the left, causing a forward movement of the drag link 9, he may do so provided he has sufficient strength to overcome the existing rearward thrust on the drag link, in which case the dog 36 will merely pull away from tooth 26, without further touching the check plate. Preferably, the spring pilots 31 and 32 will be adjusted toward each other sufficiently so that neither dog 36 nor 37 may swing inwardly far enough to actually contact the curved margins 38 on the check plate. Thus unnecessary drag at that point is avoided.

The foregoing explanation of the functioning of the device under a severe road shock tending to thrust the drag link rearwardly will be sufficient to enable one to understand how the device would work in the event of a severe forward pull or thrust on the drag link. In that case the dog 37 would engage the tooth 27.

The teeth 26 and 27 will preferably be positioned on the check plate high enough so that any severe and sudden thrust causing deflection of the lever 14, when the car is running straight ahead, will enable the inwardly swung dog to catch its associated tooth in ample time to prevent any dangerous amount of deflection of the running wheels before the check plate is able to stop the deflection. That is, the teeth must not be set up too high. On the other hand, they must not be down so low as to prevent the dogs from engaging the teeth when severe shocks occur in ordinary straight ahead running. Some leeway is allowed here, the extent of which must be measured in accordance with the particular car on which the device is used and the length and other dimensions of the several parts of the apparatus. One of the principal dangers to be guarded against is the sudden blowing out of front tires which have been known, on many occasions, to cause cars to go into ditches and overturn. This danger is, of course, great only if the car is being driven at a high rate of speed, for example, much above twenty-five miles an hour. This dangerous situation may, of course, occur on slight curves where a high rate of speed might otherwise be safely maintained. In order that this device may catch the steering mechanism and prevent it from going out of control, the teeth 26 and 27 will preferably be cut high enough on the check plate so that this safety feature will be provided even on these gentle curves. It is unnecessary to provide such a safety means where very sharp turns are being negotiated because at such times a car is ordinarily travelling below those speeds at which the blowing out of a tire is dangerous.

Usually when a front tire blows out on a car equipped with this invention, it is found that the ensuing thrust on the drag link is not constant in one direction but alternates between a forward and a rearward thrust. When this invention is observed in operation under such conditions, it will be found that first the front dog and then the rear dog comes into engagement with the respectively associated teeth and the steering apparatus is checked against the alternating thrusts. The net result will be that the car will be held on approximately a straight ahead course, a slight amount of weaving being perceptible, where the play in the mechanism is sufficient to permit this. However, as soon as the car has slowed down sufficiently, as it normally would be after a blowout, the driver will soon be able to control the existing road thrusts and may then steer the car off the pavement or elsewhere in accordance with his desires.

Figure 6:
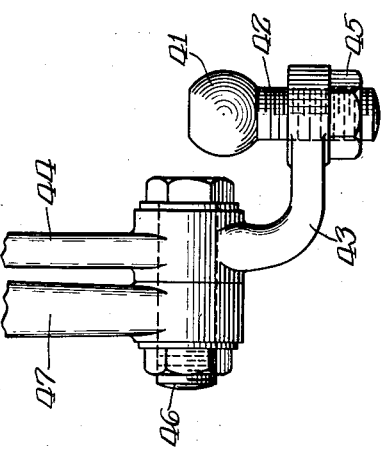
Fig. 6 is a fragmentary view showing a modified manner of mounting the ball on a control arm forming part of this invention.

Fig. 6 illustrates another mode of securing the ball member upon the lower end of the control arm in order that the center of the ball may be adjusted closer to or more remote from the center line of the pivot pin which connects the control arm to the steering arm. 41 represents the ball member to which the rear socket of a drag link is connected. The shank 42 integral with the ball may be screwed upwardly or downwardly in the horizontal extension 43 of the control arm 44 and locked in any desired position by means of a nut 45. The pin 46 pivotally connects the control arm to a steering arm 47. By reference to Fig. 3 the relation of the parts will be more readily understood. The purpose of adjusting the ball 41 closer to the center line of the pivot pin 46 is to make this steering control device more quickly responsive to thrusts exerted by the drag link. Lowering the ball away from the pivot pin will require a larger movement by the drag link to swing the control arm into engagement with either tooth on the check plate.

Figure 7:
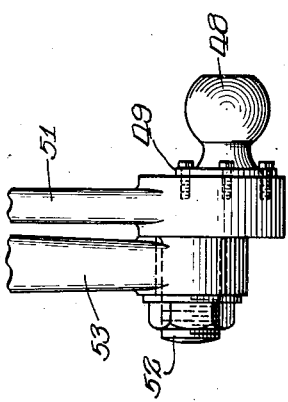
Fig. 7 is another fragmentary view showing another form of mounting the ball member on a control arm.

Fig. 7 represents another modified form of mounting for the ball on the lower end of the control arm. In this case a ball 48 is integral with a plate 49 which may be bolted, as shown, to a face of the control arm 51. A pin 52 also integral with the control arm extends through the lower end of the steering arm 53, the latter pivoting freely thereon. This construction eliminates the use of a pin on which to mount the ball member 48 and enables one to mount the same close to the center line of the pivot pin 52.

Fig. 8 represents another manner of mounting a ball member at the lower end of the control arm. In this instance a ball member 54 is integral with a plate 55 which is also integral with a pivot pin 56 which is splined in that portion which passes through the lower end of the control arm 57 while the steering arm 58 is allowed to pivot freely thereon. By withdrawing the splined pin 56 one can rotate the plate 55 clockwise or counterclockwise to thus move the center of the ball with relation to the axis of the pin 56, thus increasing or decreasing the quickness of response of this steering control arm to the movements of the drag link which is intended to be connected with the ball 54. After the pin is rotated the desired angular amount, it may be inserted into the lower end of the control arm and locked in place by means of the nut 59.

Figure 9:
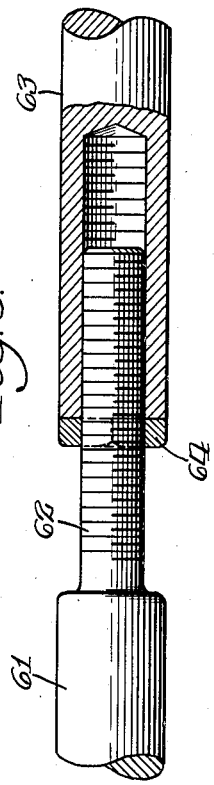
Fig. 9 is a fragmentary view showing means for adjusting the length of the drag link.

In view of the fact that these several adjustments of the ball may require a variation in the length of the drag link so that the dogs, such as 36 and 37 (see Fig. 2), will always properly engage the teeth on the check plate, I prefer to include a means for adjusting the link between its end sockets. Fig. 9 shows, therefore, a simple manner of accomplishing this, the front end of the drag link 61 being reduced and threaded at 62 and fitting into an internally threaded portion on the rear end 63 of the drag link, a lock nut 64 being provided for locking the drag link at any adjusted length.

In Figs. 10 to 13 inclusive is shown another embodiment of the invention consisting of a steering arm 71 fixed in any suitable manner as by means of splining or a key upon a steering shaft 72, the latter in the usual manner extending through the channel member 73 of the car frame. At the lower end of the steering arm is pivotally connected by means of a pin 74, a control arm 75 having an offset extension 76 on which is mounted a ball 77 for connection with the rear socket 78 on a drag link.

The upper end of the control arm 75 is bifurcated as shown in Fig. 10, the arms 79 and 80 of which terminate at 81 and 82 and are shaped for engaging teeth 83 and 84 formed on a check plate 85, affixed in any suitable manner in a stationary position, as by means of bolts 86 to the frame of the car. Instead of having a pair of centering springs as is provided in the form of the invention shown in Fig. 2, I here prefer to eliminate the pair of centering springs and provide a spring-pressed latch for normally holding the control arm parallel to the steering arm. A recess 87 is therefore provided in the control arm and the upper end of it is fashioned into a downwardly opening V-shaped notch 88. Normally seated snugly in the notch is the upper end of a cylindrical latch 89 which is preferably tapered to fit the notch. This latch is snugly carried in boss 90 formed on the inner surface of the steering arm and which extends into the recess 87. A compression spring 91 thrusts upwardly against the latch and its lower end is held in position by a plug 92 screwed into the cylindrical recess in the boss. By means of this plug the compression on this spring may be varied to some extent, although if a large variation is required a spring of different strength would preferably be substituted.

The function of the spring loaded latch carried by the steering arm and the V-shaped notch provided in the control arm is to permit little or no displacement of the control arm relative to the steering arm in response to ordinary road shocks transmitted to the control arm by the drag link. If desired, the parts may be so proportioned that no ordinary road shock will cause any deflection whatever of the control arm relatively to the steering arm. However, when there occurs a severe road shock of such dangerous proportions that it might cause the steering wheel to spin out of the hands of the driver, this latch will yield downwardly and permit the control arm to be deflected by the drag link relatively to the steering arm and become engaged with either of the teeth on the check plate, depending upon the direction of the thrust exerted by the drag link.

In some cases this construction may be preferred to that which is shown in Fig. 2, as it will be less responsive, or not at all responsive, to ordinary road thrusts, depending upon the resistance offered by the centering latch, but nevertheless immediately responsive to dangerous road shocks. Furthermore, the construction shown in Figs. 10 to 13 inclusive has the advantage of being extremely simple and requires the use of only one spring, and no thought need be given to the necessity for maintaining a pair of springs always at equal strength. While there is some friction in this device, lubrication of the parts is an extremely simple matter, hence need give no concern. The sides of the boss 90 preferably will bump against the sides of the recess 87 as the control arm is deflected, to prevent the dogs on the ends of the bifurcated control arm from striking the curved margins 93 or 94 of the check plate, yet permitting these dogs to swing in far enough to adequately contact the teeth on the check plate.

In Figs. 14 to 16 inclusive is shown another embodiment of the invention employing a centering latch with one spring and a pair of immovable teeth or stop members on opposite sides of the sector shaft. This form of the invention includes a steering arm 101 splined or otherwise suitably secured upon a sector shaft 102 and pivotally connected by means of the pin 103 to a bifurcated control arm 104. The sector shaft is rotated in any suitable manner manually by means of the steering wheel, the exact type of steering gear connection for that purpose not being a part of this invention. A nut 105 will serve to retain the steering arm fixed on the sector shaft. The lower end of the steering arm and the lower end of the control arm are provided with extensions 106 and 107 presenting flat surfaces lying snugly against each other, which will serve to contribute to the rigidity of the connection between these arms without interfering seriously with their relative rotation. Carried on the extension at the bottom of the control arm is a ball 108 which will normally be connected with the rear socket 109 on a drag link 111, the latter being connected with the dirigible running wheels. If desired, the ball may be formed integrally with the control arm or may be attached thereto in any suitable manner.

The upper end of the control arm is bifurcated to provide two arms 112 and 113, preferably shaped as indicated to provide the teeth 114 and 115 which normally will not engage but are shaped for engagement with stop members 116 and 117 which may be fixed in any suitable manner upon the frame member 118 of the vehicle. It is found convenient to form the stop members by spot-welding lugs on the outer side of the channel iron 118.

In order that the entire assembly may not project outwardly too far from the side of the car frame, it may be advisable to form the steering arm with an offset in the portion indicated by the numeral 119. The centering latch employed in this device is preferably the same or similar to the centering latch shown in Figs. 10 to 13 inclusive although a modified arrangement thereof is shown in which the latch pin 121 has its tapered point inclined downwardly instead of upwardly. This latch will be carried in a boss 122 having a cylindrical recess therefor and formed integrally on the steering arm but extending into a recess 123 which is provided in the control arm. A compression spring 124 retained by a threaded plug 125 screwed into the cylindrical recess in the boss serves to hold the latch pin normally seated in the bottom of the V-shaped notch 126 which is provided in the bottom of the recess in the control arm. If preferred, the upwardly extending latch shown in Fig. 10 may be herein employed.

In this last described embodiment of the invention, if the latch spring is strong enough and the shape of the notch and latch pin be designed with that purpose in mind, ordinary road shocks may be thus prevented from disturbing the normal parallel alignment of the control and steering arms while permitting, however, severe road shocks of dangerous proportions to deflect the control arm sufficiently, when the running wheels are pointed directly or almost directly ahead, to enable either the tooth 114 or the tooth 115 to engage the associated stop members on the frame, depending upon the direction of the road thrust exerted by the drag link on the control arm. It is contemplated that the relation between the teeth on the control arm and the stop members or check members on the car frame in this embodiment and the one shown in Fig. 10 is such that when the car is running straight ahead or only slightly deflected and a severe shock occurs, such as may be caused by the blowing out of a front tire, the control arm will be deflected sufficiently to engage the stop members and thus prevent further deflection of the front wheels in the direction they are taking as a result of such shock.

When, however, severe road shocks are not being transmitted through the drag link to the control arm, the two arms will remain parallel or substantially so and may be rotated throughout the arc of movement of the steering arm, the teeth on the control arm, of course, then not striking the stop members.

If desired, the shape of the latch and the notch in which it rests and the strength of the latch spring may be so modified as to permit road shocks of less force than dangerous proportions to cause some deflection of the control arm relatively to the steering arm without enough movement, however, to permit engagement of the teeth on the control arm with the stop members provided on the car frame. Thus some cushioning of road shocks may be provided.

As in the previously described embodiment, the outside surface of the boss which contains the latch may be employed to strike the opposite margins of the recess in the control arm to thus positively limit the deflection of the control arm relatively to the steering arm. Some other form of limiting means may be substituted, of course, if desired.

The positions of the control and steering arms in the drawings is intended to illustrate the position they occupy when the car is running straight ahead. In ordinary steering movements the manual rotation of the steering wheel will cause these two arms to oscillate together about the sector shaft as an axis either way from dead center. The position of the stop members on the car frame relatively to the dogs on the control arm is preferably arranged so that when the car is moving straight ahead and any road shock suddenly occurs equivalent to the blowing out of a front tire, or at least of such proportions that the steering wheel might be wrenched out of the driver's hands, one dog or the other will be sure to engage the associated stop member and prevent further deflection of the steering mechanism in the direction promoted by the road shock. Also, even when a car is travelling on a curve at high speed, the teeth on the check plate or the stop members on the car frame will be positioned to catch the dogs on the control arm should a dangerous shock occur. It is not necessary to provide teeth or stop members to cooperate with the control arms when the wheels are deflected greatly to the left or right because at such times the vehicle is not moving fast enough so that severe road shocks would cause a loss of steering control. The exact positioning of the stop members and the exact proportion of all the parts to accomplish these purposes then becomes a matter of design, in which enter such factors as the length of the car and the strength of shocks which can be resisted by the steering mechanism, as well as other factors.

When a severe road shock does occur there will be sufficient resistance in the gearing or other connection between the steering arm and the steering wheel so that the force of the thrust transmitted by the drag link will not cause the steering arm to rotate but rather will rotate the control arm about its pivotal connection with the steering arm until either dog engages the adjacent stop member.

After either dog becomes so engaged the driver may pull the steering wheel in the direction opposite the thrust, if he has sufficient power and no resistance to such a pull will be offered by this control mechanism.

It should be understood that the invention herein claimed is susceptible of considerable variation and may be utilized in embodiments differing from those herein illustrated, without a departure from the spirit and scope of the invention, particularly as defined in the claims which follow.

Having shown and described my invention, I claim:

1. In a vehicle steering apparatus, an arm oscillatable about a stationary axis, a second arm pivotally connected between its ends to the first arm at a distance from said axis, a reciprocable link connected with the second arm at a point spaced from said pivotal connection, yieldable means normally maintaining the two arms relatively non-rotatable about said pivotal connection, and stationary stop members on opposite sides of said axis directly engageable by said second arm when the latter becomes rotated relatively to the first arm only during substantially straight ahead steering for opposing deflection of the apparatus.

2. In a vehicle steering apparatus, an arm oscillatable about a stationary axis, a second arm pivotally connected to the first arm at a distance from said axis, a reciprocable link connected with the second arm at a point spaced from said pivotal connection, yieldable means normally restraining the two arms against relative rotation about said connection, said second arm being bifurcated in its upper end and shaped to provide a dog lying at either side of said axis, and stationary check members at either side of said axis each providing a single projection to be engaged by the adjacent dog whenever the second arm rotates relatively to the first arm more than a predetermined amount when the link and arm mechanism is steering the vehicle approximately straight ahead.

3. In a vehicle steering apparatus, an arm oscillatable about a stationary axis, a second arm pivotally connected to the first arm at a distance from said axis, a reciprocable link connected with the second arm at a point spaced from said pivotal connection, yieldable means normally restraining the two arms against relative rotation about said connection, said second arm being bifurcated in its upper end and shaped to provide a dog lying at either side of said axis, and stationary check members at either side of said axis each providing a single projection to be engaged by the adjacent dog whenever the second arm rotates relatively to the first arm more than a predetermined amount when the link and arm mechanism is steering the vehicle approximately straight ahead, said yieldable means comprising a single spring loaded member carried by one arm and normally seated in a notch provided in the other arm.

4. In a vehicle steering apparatus, an arm oscillatable about a stationary axis, a second arm pivotally connected to the first arm at a distance from said axis, a reciprocable link connected with the second arm at a point spaced from said pivotal connection, yieldable means normally restraining the two arms against relative rotation about said connection, said second arm being bifurcated in its upper end and shaped to provide a single toothed dog lying at either side of said axis, and stationary check members at either side of said axis each providing a single projection to be engaged by the adjacent dog whenever the second arm rotates relatively to the first arm more than a predetermined amount when the link and arm mechanism is steering the vehicle approximately straight ahead, said yieldable means comprising a single spring loaded member carried by one arm and normally seated in a notch provided in the other arm.

5. In a vehicle steering apparatus, an arm oscillatable about a stationary axis, a second arm pivotally connected between its ends to the first arm at a distance from said axis, a reciprocable link connected with the second arm at a point spaced from said pivotal connection, a notch being provided on one of said arms and a spring pressed plunger being carried by the other arm cooperating with said notch for normally maintaining the two arms relatively non-rotatable about their pivotal connection but yieldably permitting some relative rotation, stationary check members at either side of said axis, and means on said second arm for contacting said check members upon predetermined rotation of the second arm about said pivotal connection for checking rotation of the first arm about its axis.

6. In a vehicle steering apparatus, an arm oscillatable about a stationary axis, a second arm pivotally connected between its ends to the first arm at a distance from said axis, a reciprocable link connected with the second arm at a point spaced from said pivotal connection, yieldable means normally maintaining the two arms relatively non-rotatable about said pivotal connection, stationary check members on either side of said axis, said second arm having a bifurcated upper end portion normally extending laterally beyond said check members with projections thereon alternatively connectible with the adjoining check members upon predetermined rotation of the second arm about its pivotal connection with the first arm for checking rotation of the first arm about said axis.

7. In a vehicle steering apparatus, an arm oscillatable about a stationary axis, a second arm pivotally connected between its ends to the first arm at a distance from said axis, a reciprocable link connected with the second arm at a point spaced from said pivotal connection, yieldable means normally maintaining the two arms relatively non-rotatable about said pivotal connection, the upper end portion of said second arm being bifurcated and each bifurcation having a laterally extending projection, and stationary check members at either side of said axis and normally laterally beyond said projections but engageable thereby alternatively upon predetermined relative rotation of the two arms for checking rotation of the first arm about said axis.

8. In a vehicle steering apparatus, an arm oscillatable about a stationary axis, a second arm pivotally connected between its ends to the first arm at a distance from said axis, a reciprocable link connected with the second arm at a point spaced from said pivotal connection, yieldable means normally maintaining the two arms relatively non-rotatable about said pivotal connection, the upper end portion of said second arm being bifurcated and each bifurcation having a laterally extending projection, stationary check members at either side of said axis and normally laterally beyond said projections but engageable thereby alternatively upon predetermined relative rotation of the two arms for checking rotation of the first arm about said axis, said link being connected at its forward end with a front wheel steering mechanism such as a steering knuckle or the like, and means for adjusting the length of the link between its ends for positioning the projections on the second arm equidistant from the check members in normal straight ahead position.

9. In a vehicle steering apparatus, the combination of a steering arm oscillatable about a stationary axis, a control arm, a bolt by which said control arm is pivotally mounted between its ends upon said steering arm in proximity to the free end of said steering arm, a drag link adapted to be connected with the steering wheels, and a ball and socket connection between said link and one end of said control arm, said connection being adjustably mounted on said control arm to permit adjustment thereof toward and from the axis of said bolt.

ARTHUR A. FRIESTEDT.